June 14, 1960 E. CHRISTIAN 2,941,075

FM-DISCRIMINATOR

Filed Feb. 24, 1959

INVENTOR.
ERICH CHRISTIAN

BY Harry M. Saragovitz

ATTORNEY 2,941,075
Patented June 14, 1960

2,941,075

FM-DISCRIMINATOR

Erich Christian, San Carlos, Calif., assignor to the United States of America as represented by the Secretary of the Army Filed Feb. 24, 1959, Ser. No. 795,301
6 Claims. (Cl. 250—27)
(Granted under Title 35, U.S. Code (1952), sec. 266)

The invention described herein may be manufactured and used by and for the United States Government for governmental purposes, without the payment to me of any royalty thereon.

The invention relates in general to an FM-discriminator and more particularly to an FM-discriminator having a high sensitivity and a wideband response.

Discriminators in automatic frequency control (AFC) systems generate a D.C. voltage, the polarity of which depends on the frequency deviation of the input signal from the center frequency of the discriminator. The sensitivity and band of response of a discriminator are each dependent on the other. If it is desired to increase the sensitivity of a discriminator it is necessary to narrow the band of response of the discriminator, and vice versa, if it is desired to make the band of response of a discriminator wider it is necessary to decrease the sensitivity of the discriminator. This feature has disadvantages in AFC systems as it is desirable to have a discriminator having both high sensitivity and a wide-band response. I have discovered a discriminator circuit arrangement which has the advantages of both high sensitivity and a wide-band response.

The novelty of my circuit arrangement resides in the fact that a narrowband and a wideband FM-discriminator are designed around one vacuum tube. A radio frequency input signal is fed to the control grid of a pentode, the plate circuit of which contains a narrowband discriminator. In series with the screen grid are two tuned circuits, each having a different resonant frequency. A broadband discriminator is in coupling relationship to the two tuned circuits. There will be a frequency between the resonant frequencies of the two tuned circuits at which the series circuit will resonate. This resonant frequency is made equal to the center frequency of the narrowband discriminator which causes the screen grid to be substantially grounded when the frequency of the input signal is in the neighborhood of the center frequency and the narrowband discriminator has maximum sensitivity. When the frequency of the input signal approaches the resonant frequency of one of the two tuned circuits a D.C. voltage is obtained from the broadband discriminator, the polarity of which depends on the sign of the frequency deviation from the resonant frequency of the series circuit. The narrowband and wideband discriminator voltages can be used separately to act on different AFC devices or combined to act on a single device.

It is therefore an object of my invention to provide a circuit arrangement having a narrowband and a wideband FM-discriminator designed around one vacuum tube.

Another object of my invention is to provide an FM-discriminating circuit having broad and sharp discriminating characteristics.

Another object of my invention is to provide a relatively simple discriminator circuit means which has broad and sharp discriminating characteristics and can be utilized in a frequency control system.

Another object of my invention is to provide a circuit arrangement using two FM-discriminators in which near the nominal frequency one of the discriminators is operative and the other is substantially inoperative and when the deviation from the nominal frequency is large the said other discriminator is operative and the said one discriminator is substantially inoperative.

Other objects and a fuller understanding of the invention may be had by referring to the following description and claims, taken in conjunction with the accompanying drawings in which:

Figure 1:
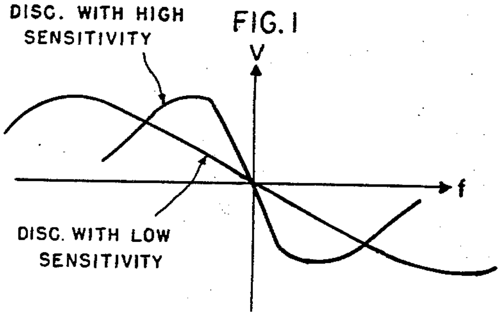
Figure 1 shows typical discriminator curves.

With reference to the drawings, Figure 1 shows two typical discriminator frequency voltage curves, one with high sensitivity and the other with low sensitivity. It can be noted from the curves, that in order to make a discriminator more sensitive it is necessary to bring the two peaks of the discriminator curve closer together. This has the disadvantage that the D.C. voltage output of the discriminator decreases rapidly with increasing frequency deviation of the input signal applied to the discriminator. It can also be noted from the curves that if the two peaks of a curve are made to be further apart the sensitivity of the discriminator is decreased.

Figure 2:
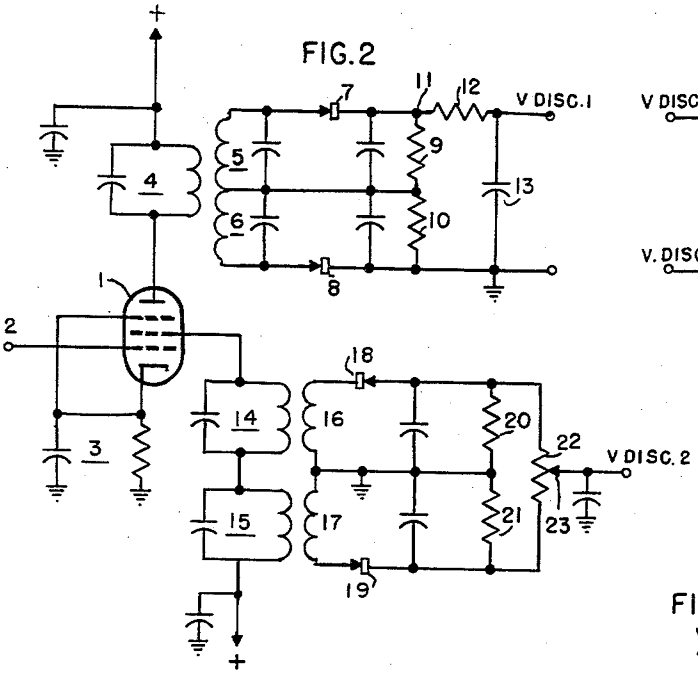
Figure 2 is a schematic illustration of the circuit embodying the invention.

Figure 2 discloses a circuit arrangement in which the advantages of both high sensitivity and wideband response are attained. The pentode 1 has an input terminal 2 connected to its control grid, to which a radio frequency input signal is to be applied. The resistor and capacitor unit 3 connects the cathode and suppressor grid to ground. The plate of the pentode is connected through an LC circuit 4 to a power supply, and the LC circuit 4 is tuned to a center frequency $f_c$. The LC circuits 5 and 6 are inductively coupled to LC circuit 4 and are tuned to predetermined frequencies slightly above and slightly below the center frequency $f_c$. The diodes 7 and 8 develop across their load resistors 9 and 10, voltages that vary with the frequency of the voltage applied to the input terminal 2. The voltages across resistors 9 and 10 are of opposite polarity; therefore, the voltage at terminal 11 is the difference between the voltages across resistors 9 and 10. The voltage at terminal 11 is applied to a low pass filter, consisting of resistor 12 and capacitor 13, for the purpose of decreasing any ripple in the voltage at terminal 11. The frequency input-voltage output curve of the discriminator in the plate circuit will take the form of the high sensitivity curve of Figure 1. I do not wish to limit my disclosure to the particular discriminator shown and described in the plate circuit as any discriminator with a high sensitivity characteristic could be used. The signal in the plate circuit can also be used, without applying it to a discriminator, by applying it to a low pass filter.

Figure 3:
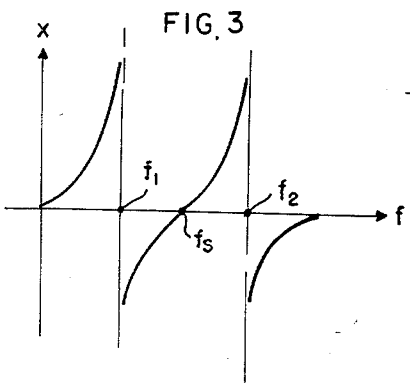
Figure 3 shows the reactance curves of the tuned circuits in the screen grid circuit of the pentode in Figure 2.

In series with the screen grid of pentode 1 are two LC circuits 14 and 15 which are tuned to resonant frequencies $f_1$ and $f_2$. The frequency $f_1$ is less than the resonant frequency of the LC circuit 5 and 6 which is tuned to a frequency slightly below the center frequency $f_c$ and the frequency $f_2$ is greater than the resonant frequency of the LC circuit 5 or 6 which is tuned to a frequency slightly above the center frequency $f_c$. The inductances of the two LC circuits 14 and 15 are the primaries of two transformers. The reactance curves of the screen grid circuit is shown in Figure 3. When the frequency of the input voltage is below $f_1$ and increasing, the reactance of the two LC circuits in series is inductive and increasing. When the frequency is $f_1$, one of the two LC circuits will have a very high resistive impedance; therefore, the impedance of the series circuit will be very high. As the frequency increases beyond $f_1$ the reactance of the LC circuit tuned to $f_1$ will be capacitive and the reactance of the LC circuit tuned to $f_2$ will be inductive. The reactance of the series circuit will be capacitive until the freqency reaches a frequency $f_s$ at which frequency the series circuit will be resonant, because the inductive reactance of the LC circuit tuned to $f_2$ will be equal to the capacitive reactance of the LC circuit tuned to $f_1$. As the frequency increases beyond $f_s$ the reactance of the series circuit will be inductive until the frequency reaches $f_2$ at which frequency the LC circuit tuned to $f_2$ will have a very high resistive impedance; therefore, the series circuit will have a very high impedance. As the frequency increases beyond $f_2$ the reactance of the series circuit becomes capacitive and decreasing.

The voltages induced in transformer secondaries 16 and 17 by the transformer primaries of the LC circuits 14 and 15, will be combined through diodes 18 and 19 and will appear across resistors 20 and 21. Potentiometer 22 has a slider 23 which is adjusted to a zero potential which the input signal applied to terminal 2 is at frequency $f_s$. When the frequency of the input signal deviates from the frequency $f_s$ a voltage will appear at slider 23 which will be representative of the frequency deviation from $f_s$. The frequency input-voltage output curve of the discriminator in the screen grid circuit will take the form of the low sensitivity curve of Figure 1. I do not wish to limit my invention to the particular discriminator circuit shown and described in the screen grid circuit as others could be used. For instance, the LC circuits 14 and 15 could be two inductances connected in series and a discriminator such as shown in the plate circuit could be used by tuning LC circuits 5 and 6 to resonant frequencies $f_1$ and $f_2$, and inductively coupling the two LC circuits to the two inductances.

Frequency $f_c$ is made equal to frequency $f_s$ and the operation of the circuit of Figure 2 is as follows: An input signal is applied to the grid of pentode 1 through terminal 2. If the frequency of the input signal is close to the center frequency $f_c$ of the discriminator in the plate circuit of the pentode, the reactance of the series circuit in the screen grid will be very low, the tube 1 acts as a pentode and the narrow band discriminator in the plate circuit has maximum sensitivity. If the frequency deviation from $f_c$ becomes larger either the tuned circuit 14 or the tuned circuit 15 will reasonate causing the discriminator in the screen grid circuit to become more effective and the discriminator in the plate circuit to become less effective.

Figure 4:
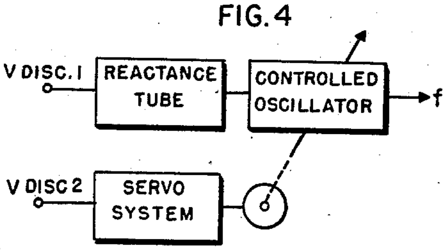
Figure 4 illustrates how the two discriminator voltages of Figure 2 can be used to act on different AFC devices.

Figure 4 shows how the voltages, $V_{disc.\ 1}$ and $V_{disc.\ 2}$, the output voltages of the discriminators in Figure 2, can be utilized separately to control an oscillator. One of the voltages controls the oscillator through a reactance tube and the other voltage is used to control the oscillator through a servo system.

Figure 5:
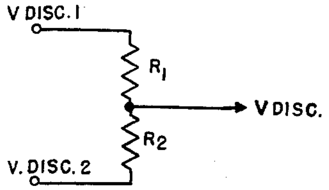
Figure 5 shows how the two discriminator voltages of Figure 2 can be combined to act on a single device.

Figure 5 shows how the voltages, $V_{disc.\ 1}$ and $V_{disc.\ 2}$, can be combined to act on a single device. The two voltages are added through resistors $R_1$ and $R_2$, such that, $$V_{disc.}=V_{disc.1}\frac{R_2}{R_1+R_2}+V_{disc.2}\frac{R_1}{R_1+R_2}$$

Figure 6:
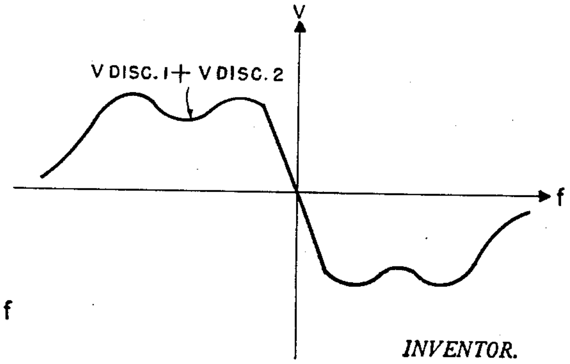
Figure 6 shows a curve of the output voltage of Figure 5.

The graph of the voltage at the output of the circuit in Figure 5 is shown by Figure 6. The output of the circuit of Figure 5 can be used to control an oscillator.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

What is claimed is:

1. A frequency discriminator having both high sensitivity and a wideband frequency response comprising a vacuum tube having a plate, a cathode, a control grid and screen grid, means connected to said control grid for feeding a radio frequency input signal to said vacuum tube, means connected to the plate of said tube and tuned to a predetermined frequency, means coupled with said last named means and responsive over a narrow band of frequencies for producing a voltage which varies about a predetermined value as the frequency of the voltage in the plate circuit varies about the predetermined frequency, means connected to the screen grid of said tube and tuned to the said predetermined frequency and responsive over a wide band of frequencies, means coupled with said last named means for producing a voltage which varies about the said predetermined value as the frequency of the voltage in the grid circuit varies about the predetermined frequency and means for combining the voltages, produced by the two said means for producing a voltage, to provide a voltage which varies over a wide band of frequencies and sharply in the region of said predetermined frequency.

2. A frequency discriminator having both high sensitivity and a wideband frequency response comprising a vacuum tube having a plate, a control grid and a screen grid, means connected to said control grid for feeding a radio frequency input signal to said vacuum tube, means connected to the plate of said tube and responsive over a narrow band of frequencies for producing a voltage which varies about a predetermined value as the frequency of the voltage in the plate circuit varies about a predetermined frequency, means connected to the screen grid of said tube and responsive over a wide band of frequencies for producing a voltage which varies about the said predetermined value as the frequency of the voltage in the screen grid circuit varies about the said predetermined frequency and means for combining the voltages, produced by the two said means for producing a voltage, to provide a voltage which varies over a wide band of frequencies and sharply in the region of said predetermined frequency.

3. A frequency discriminator having both high sensitivity and a wideband frequency response as claimed in claim 2 in which the said means connected to the screen grid comprises two parallel inductive-capacitive circuits connected in series and tuned to frequencies whose difference is greater than said narrow band and such that the impedance of the two parallel circuits connected in series is zero at the said predetermined frequency and means coupled to said two inductive-capacitive circuits for producing a voltage which varies about the said predetermined value as the frequency of the voltage in the screen grid circuit varies about the said predetermined frequency.

4. In a frequency control system, a vacuum tube having a plate, a control grid and a screen grid, means connected to said control grid for feeding a radio frequency input signal to said vacuum tube, means connected to plate of said tube and responsive over a predetermined band of frequencies for producing a voltage which varies about a predetermined value as the frequency of the voltage in the plate circuit varies about a predetermined frequency, means connected to the screen grid of said tube and responsive over a band of frequencies greater than said predetermined band of frequencies for producing a voltage which varies about the said predetermined value as the frequency of the voltage in the screen grid circuit varies about the said predetermined frequency.

5. In a frequency control system as claimed in claim 4 in which the said means connected to the screen grid comprises two parallel inductive-capacitive circuits connected in series and tuned to frequencies whose difference is greater than said predetermined band and such that the impedance of the two parallel circuits connected in series is zero at the said predetermined frequency and means coupled to said two inductive-capacitive circuits for producing a voltage which varies about the said predetermined value as the frequency of the voltage in the screen grid circuit varies about the said predetermined frequency.

6. A frequency discriminator having both high sensitivity and a wideband frequency response comprising a vacuum tube having a plate, a control grid and a screen grid, means connected to said control grid for feeding a radio frequency input signal to said vacuum tube, means connected to the plate of said tube and responsive over a predetermined range of frequencies for producing a voltage which varies about a predetermined value as the frequency of the voltage in the plate circuit varies about a predetermined frequency, a first parallel inductive-capacitive circuit connected to the said screen grid and tuned to a frequency which is less than the lower limit of said predetermined range, a second parallel inductive-capacitive circuit connected in series with said first inductive-capacitive circuit and tuned to a frequency which is greater than the upper limit of said predetermined range and such that the total inductance of the two inductive-capacitive parallel circuits is zero at said predetermined frequency, a first diode and resistor connected in series and inductively coupled across said first parallel inductive-capacitive circuit, a second diode and resistor connected in series and inductively coupled across said second parallel inductive-capacitive circuit, and means for combining the voltages across the two resistors and the voltage produced by the second mentioned means.

References Cited in the file of this patent

UNITED STATES PATENTS

| | | |
|---|---|---|
| 2,423,229 | Crosby | July 1, 1947 |
| 2,568,412 | Robinson | Sept. 18, 1951 |